United States Patent [19]

Barnes

[11] B  4,124,330
[45]  Nov. 7, 1978

[54] CAM-OPERATED PITCH-CHANGE APPARATUS

[75] Inventor: Philip E. Barnes, West Hartford, Conn.

[73] Assignee: The United States of America as represented by the Administrator, National Aeronautics and Space Administration, Washington, D.C.

[21] Appl. No.: 513,346

[22] Filed: Oct. 9, 1974

[44] Published under the second Trial Voluntary Protest Program on March 9, 1976 as document No. B 513,346.

[51] Int. Cl.$^2$ ............................................. B64C 11/30
[52] U.S. Cl. ................................ 416/157 B; 416/162; 416/160; 416/167
[58] Field of Search ................. 416/157, 160, 162, 167

[56]  References Cited

U.S. PATENT DOCUMENTS

| | | | |
|---|---|---|---|
| 2,460,559 | 2/1949 | Wildhaber | 416/160 |
| 2,479,668 | 8/1949 | Brandon et al. | 416/167 |
| 2,801,068 | 7/1957 | Deriaz | 416/167 |
| 3,260,311 | 7/1966 | Kovats | 416/157 X |
| 3,331,446 | 7/1967 | Feroy | 416/167 X |
| 3,489,338 | 1/1970 | Chilman | 416/157 |
| 3,801,219 | 4/1974 | Parsons et al. | 416/157 |

FOREIGN PATENT DOCUMENTS

| | | | |
|---|---|---|---|
| 798,405 | 5/1936 | France | 416/167 |
| 1,012,869 | 7/1957 | Germany | 416/167 |
| 529,023 | 6/1955 | Italy | 416/167 |
| 568,533 | 4/1945 | United Kingdom | 416/167 |

*Primary Examiner*—Everette A. Powell, Jr.
*Attorney, Agent, or Firm*—Robert F. Kempf; Norman T. Musial; Robert Kinberg

[57]  ABSTRACT

A pitch-change apparatus for a ducted thrust fan having a plurality of variable pitch blades employs a camming ring mounted coaxially of the hub at an axially fixed station along the hub axis for rotation about the hub axis both with the blades and relative to the blades. The ring has a generally spherical outer periphery and a plurality of helical camming grooves extend in a generally spherical plane on the periphery. Each of the variable pitch blades is connected to a pitch-change horn having a cam follower mounted on its outer end, and the camming ring and the horns are so arranged about the hub axis that the plurality of followers on the horns engage respectively the plurality of helical camming grooves. Rotary drive means receives pitch-change commands from an appropriate controller and rotates the camming ring relative to the blades to cause blade pitch to be changed through the cooperative operation of the camming grooves on the ring and the cam followers on the pitch-change horns.

8 Claims, 4 Drawing Figures

CAM-OPERATED PITCH-CHANGE APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 USC 435; 42 USC 2457).

CROSS-REFERENCE TO RELATED APPLICATIONS

This application contains subject matter which is related to copending applications Ser. No. 334,350, now U.S. Pat. No. 3,902,822, entitled Modular Gearbox for a Variable Pitch Fan Propulsor and Ser. No. 513,323, now U.S. Pat. No. 4,021,142, entitled Pitch-Change Apparatus for a Ducted Thrust Fan filed respectively on Feb. 21, 1973 and, Oct. 9, 1974.

BACKGROUND OF THE INVENTION

The present invention relates to apparatus for changing the pitch of a fan blade and, more particularly, the invention is concerned with apparatus for varying the blade pitch of a ducted thrust fan having a plurality of closely spaced blades mounted on the fan hub.

By-pass engines utilizing a ducted thrust fan driven by a turbine-type power plant have been recognized as exemplifying the current state-of-the-art in propulsion systems for aircraft. The fans have high by-pass ratios in the range of 5:1 or 6:1 and operate at fan pressure ratios of 1.4 to 1.5 at rated load. High blade solidity from closely spaced blades and high tip speeds are required for such ratios.

To optimize both take-off performance and cruise performance, it is desirable to vary the pitch of the fan blades. In addition, a variable pitch fan may also be used to produce reverse thrust during landings. Other reversing devices can be eliminated. Accordingly, a variable pitch thrust fan is currently favored by several propulsion system manufacturers.

Providing a pitch-change apparatus for a ducted thrust fan is complicated by several factors. The apparatus should be light-weight and compact since it will be mounted in the fan hub. The hub rotates at high speed to obtain the high by-pass and pressure ratios and, hence, centrifugal growth must be considered. The large number of blades in close proximity to one another at the hub and the large blade angles through which each blade must be turned to go from forward to reverse pitch place stringent requirements on the size of the apparatus and the magnitude of the displacements and forces produced by the apparatus. Non-linear variations in the blade twisting moments in the range from forward to reverse pitch through feathered pitch must be accommodated by the control loads carried by the apparatus.

U.S. Pat. application Ser. No. 334,350, now U.S. Pat. No. 3,902,822 by Andrews et al., referenced above discloses a ducted thrust fan of the type to which the present invention relates. The fan has variable pitch blades which are located within a by-pass duct at the front end of a turbine power plant. The pitch change mechanism utilizes bevel gearing which develops a constant mechanical advantage throughout the full pitch range. Accordingly, the gearing and the mechanism operating the gearing must be designed to accept the peak input loads in a load curve proportional to the blade twisting moment.

Flexibility in adjusting the input load curve developed by the pitch-change apparatus is desirable to minimize the weight of the apparatus. Furthermore, it has been determined that the pitch-change apparatus can be used to partially balance centrifugal blade twisting moments which are significant at the high rotational speeds of ducted fan jets driven by turbine-type power plants.

It is, accordingly, a general object of the present invention to disclose a pitch-change apparatus which possesses the desirable qualities mentioned above.

SUMMARY OF THE INVENTION

The present invention resides in a pitch-change apparatus for a ducted thrust fan having a plurality of variable pitch blades mounted in close proximity to one another on a fan hub. The blades extend radially from the hub and are rotatable relative to the hub about blade axes perpendicular to the hub axis. The hub is most generally driven by a turbine-type power plant and is connected directly to the turbine for high rotational speed.

The apparatus includes a plurality of pitch-change horns connected respectively to the plurality of variable pitch blades. Each horn projects outwardly from the blade axis so that pivoting movement of the horn produces a corresponding movement of the blade about its own blade axis and a change in blade pitch.

A camming ring is mounted coaxially of the hub at an axially fixed station along the hub axis. The ring is permitted to rotate about the hub axis both with the blades and relative to the blades but is otherwise constrained at the axially fixed station. The outer periphery of the ring defines a plurality of helical camming grooves extending about the hub axis, one groove being provided for each of the plurality of blades. The grooves lie in a spherical plane and a plurality of cam followers mounted respectively on the plurality of pitch-change horns engage the grooves in cooperative camming relationship. The location of the grooves in a spherical plane permits the pitch-change horns to rotate about the blade axes in response to rotations of the camming ring about the hub axis without disengaging the cam followers and the grooves. The contouring of the grooves determines in part the mechanical advantage of the apparatus or the rate of pitch-change for a constant input rate.

Rotary drive means are connected in driving relationship with the camming ring to cause the ring to be rotated and blade pitch to be changed by means of the cooperative relationship of the camming grooves on the ring and the cam followers on the pitch-change horns.

Flexibility in contouring the camming grooves permits the loading imposed upon the rotary drive means and associated servomechanism to be made relatively uniform over a contemplated range of pitch-changes. Thus, the rotary drive means and the associated servomechanism can be designed for known loads and minimum overall weight. Flexibility in contouring the grooves also allows the pitch-change horns to be connected to the blades in a manner which tends to minimize the centrifugal twisting moments generated by the horns and the blades in combination.

DESCRIPTION OF THE PREFERRED EMBODIMENTS

Figure 1:
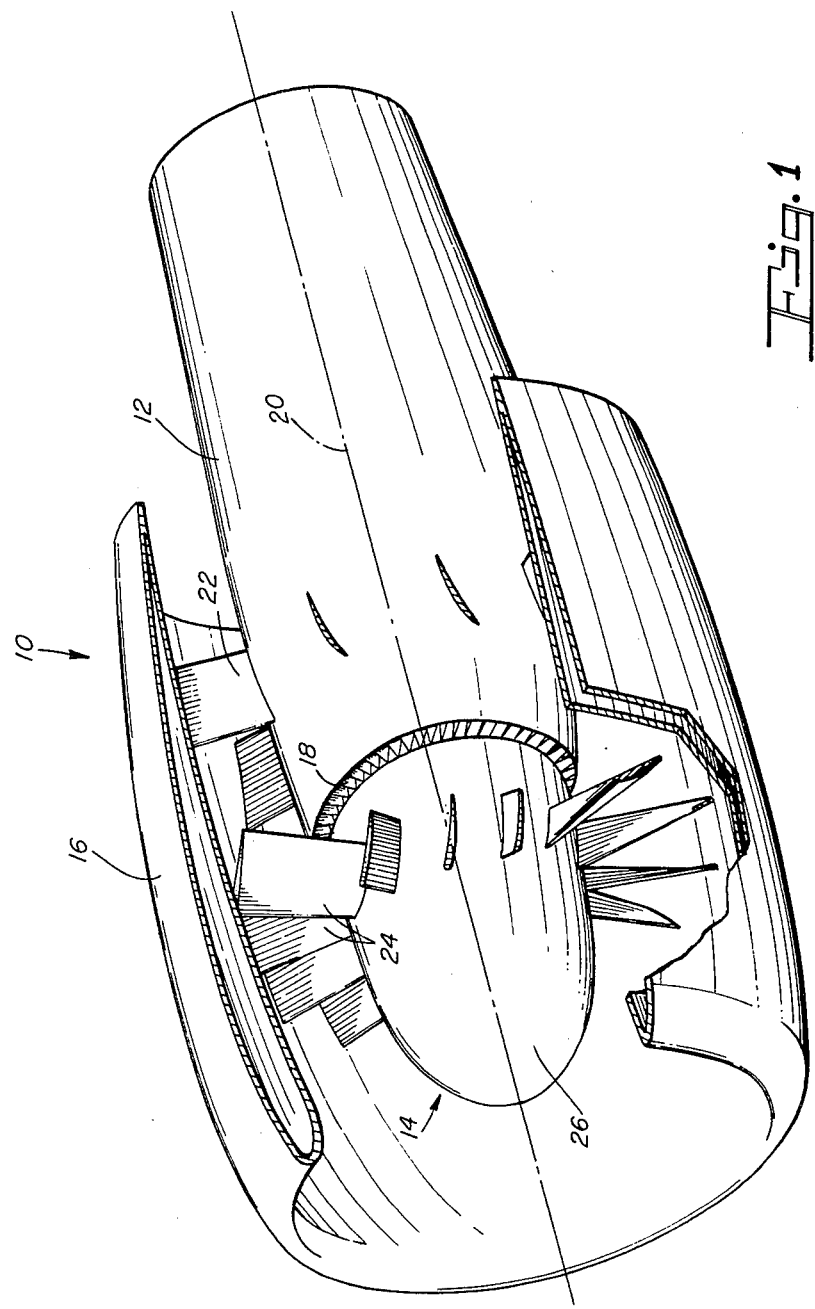
FIG. 1 is a perspective view of a ducted thrust fan propulsion unit or propulsor having variable pitch blades controlled by the apparatus of the present invention.

FIG. 1 shows a ducted thrust fan propulsion unit of the type in which the pitch-change apparatus of the present invention is employed. The propulsion unit, generally designated 10, has utility as an aircraft propulsor and has a turbine-type power plant 12 on which a thrust fan 14 and a by-pass duct 16 are mounted. The fan 14 is connected to the forward end of the power plant adjacent the compressor inlet 18 and is rotatably driven by the power plant. For example, the fan may be driven by a separate gas turbine in the engine or the fan may be driven jointly with the compressor.

The by-pass duct 16 is supported over the fan 14 and is mounted coaxially of the hub and engine axis 20 by means of a series of stand-off struts 22 to provide an annular by-pass between the power plant 12 and the trailing portion of the duct. The variable pitch blades 24 of the fan 14 extend from the hub 26 into close proximity to the inside surface of the duct 16 to insure efficient displacement of air through the fan into the compressor inlet 18 or the annular by-pass. The number of variable pitch blades 24 mounted on the hub 26 depends upon the size of the propulsion unit, and fans with 15 or more blades are not uncommon.

Figure 2:
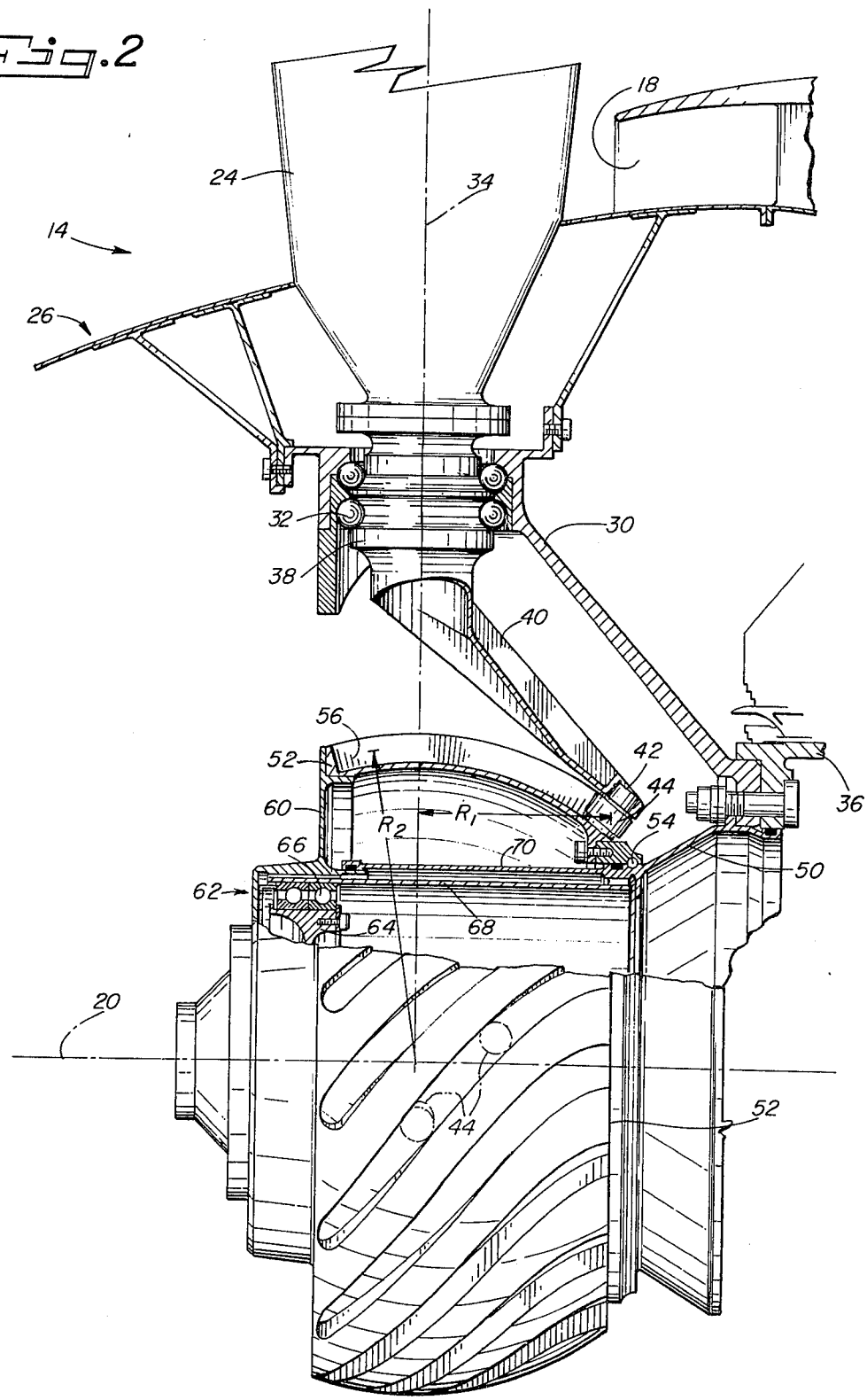
FIG. 2 is a longitudinal half section of the fan showing the pitch-change apparatus of the present invention within the hub.
Figure 3:
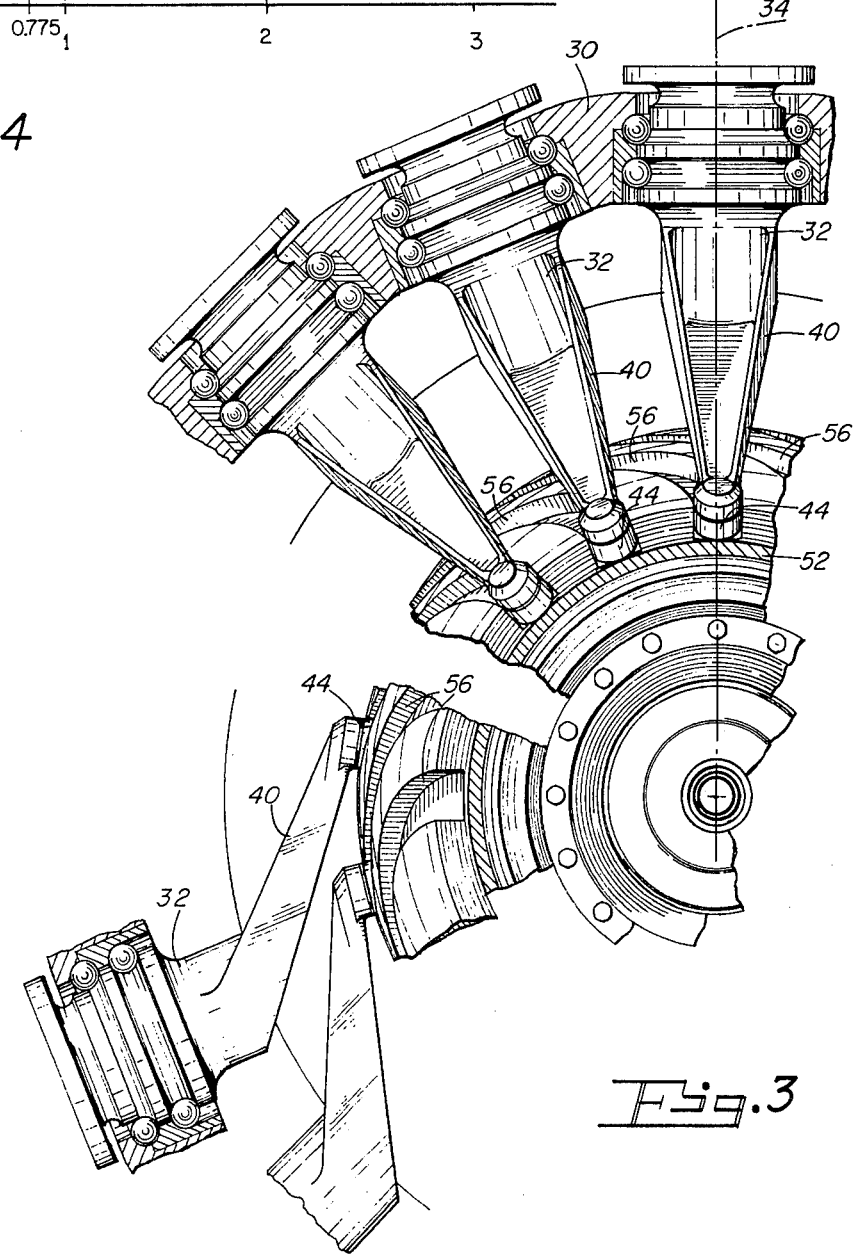
FIG. 3 is a fragmentary axial end view of the hub showing the camming grooves on the camming ring engaged by the cam followers at the ends of the pitch-change horns.

FIGS. 2 and 3 illustrate the pitch-change apparatus of the present invention in detail. The apparatus is housed within the hub 26 and cooperates with each of the blades 24 to collectively vary blade pitch between forward-, feathered- and reverse-pitch positions. The blades are held in a hub support or housing 30 by means of thrust bearings 32 which permit the blades to rotate about their respective blade axes 34 and thereby vary blade pitch. The hub housing 30 and the blades 24 are connected to the forward end of a power shaft 36 for rotation about the hub axis 20 by the power plant 12 in FIG. 1.

Since the control of blade pitch is accomplished in the same manner for each blade 24 and since the pitch-change apparatus is comprised of a plurality of similar components for each blade, the components associated with only one blade will be discussed hereinafter unless an element common to each of the blades or the collective operation of the blades is described.

The inner end of the blade 24 is connected to a stub shaft 38 rotatably mounted in the housing 30 by the bearings 32. A pitch-change arm or horn 40 integrally connected to the stub shaft extends radially away from the shaft and the blade axis 34. Rotation of the horn about the axis will, therefore, produce a corresponding rotation of the blade and a change in blade pitch.

The pitch-change horn 40 is preferably connected to the stub shaft 38 and the blade 24 so that the horn lies in a plane defined by the plurality of blade axes 34, that is a plane perpendicular to the hub axis 20, when the blade is in the feathered-pitch position. With this angular relationship of the blade and horn about the axis 34, centrifugal twisting moments developed by the blade and horn respectively will tend to cancel one another and thus reduce the total twisting moment that must be countered or reacted by the pitch-change apparatus at any given pitch position. Although this angular relationship is preferred from the standpoint of twisting moments, it may be necessary to depart from this relationship by varying amounts in order to minimize the overall control loads in the input load curve which are attributable to several other design factors of the pitch-change apparatus.

At the extreme outer end of the pitch-change horn 40 a pin 42 is fixedly secured in the horn and a roller 44 is mounted on the pin with freedom to rotate about the pin axis relative to the pin and horn. As explained in further detail below, the roller 44 serves as a cam follower which is caused to move about the blade axis 34 and produce changes in blade pitch.

A forward projecting flange 50 is also bolted to the front end of the power shaft 36 for rotation with the hub housing 30. At the forward end of that flange, a camming ring 52 shown partially in section and partially in full view is mounted coaxially of the axis 20 by means of bearings 54. The bearings 54 fix the ring 52 at a given axial position along the hub axis 20 but permit the ring to rotate about the axis with the blades 24 and also relative to the blades. The periphery of the ring bears a plurality of helical camming grooves 56 that extend about the axis 20 and from the rear side of the ring to the forward side of the ring. The grooves correspond in number with the blades 24 and are engaged in camming relationship with the respective rollers 44 and pitch horns of the blades.

It should be understood that the groove 56 shown at the top of the ring in FIG. 2 has been distorted from its helical path in order to illustrate the groove along its full length in section. Similarly, the pitch-change horn 40 has been rotated relative to the blade 24 in order to illustrate the roller 44 at the end of the horn in engagement with the groove. A more accurate representation of the helical grooves is given in the nonsectioned portion of the ring in FIG. 2. Thus, the grooves on the ring 52 serve as camming means and the rollers 44 on the horns 40 serve as cam followers. Rotation of the ring about the hub axis 20 is accompanied by a corresponding rotation of the pitch-change horns 40 and the blades 24 about the blade axes 34. Since each of the grooves 56 has the same shape and the grooves are spaced about the ring 52 in the same manner as the blades, the changes in blade-pitch occur collectively and by the same amount when the ring is rotated.

The degree of pitch-change for a given rotation of the ring 52 depends upon the contours of the camming grooves. The contours are selected to require a relatively uniform input load at the ring 52 for the camming operation over the full range of pitch settings even though the twisting moments developed by the blades are variable. Thus, the helix angle or slope of the grooves may vary from one end of the groove to the other as illustrated by the grooves in the non-sectioned portion of the ring in FIG. 2.

The grooves 56 lie generally in a spherical plane on the periphery of the ring 52. More particularly, the open top and the closed bottom of the grooves are equidistant from and imaginary spherical surface having a geometric center located at the intersection of the blade axes 34 and at the hub axis 20 and a radius $R_2$ in FIG. 2. The grooves also extend in opposite directions over the axially fixed ring 52 from the plane defined by the blade axes 34 to allow the pitch horns 40 to sweep through relatively larger arcs and develop a board range of pitch settings. The different angular positions of the horns 40 in the two fragments of FIG. 3 are 90° apart; however, a total range of angular positions and corresponding pitch settings in the order of 130° is readily obtainable when the roller 44 moves from one end of the grooves to the other.

Figure 4:
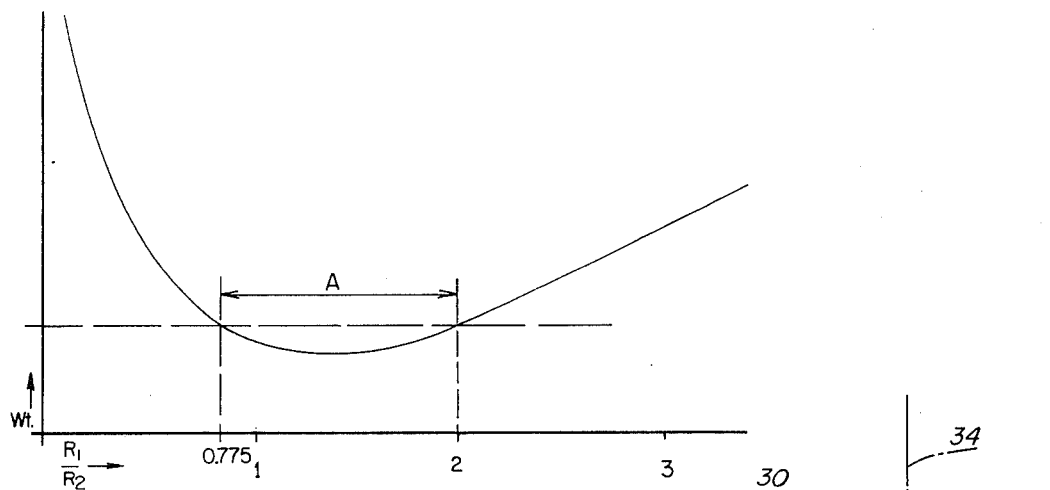
FIG. 4 is a graph illustrating the variation in weight of the pitch change apparatus for various ratios of the camming ring radius and pitch horn radius.

FIG. 4 illustrates the variation in design weight of the pitch-change apparatus for a given thrust fan when the effective radius $R_1$ in FIG. 2 of the pitch-change horn 40 and the radius $R_2$ of the camming ring 52 are varied in a ratio $R_1/R_2$. The weight of the pitch-change apparatus includes the weight of the horn 40, the camming ring 52 and the rotary drive means which rotates the ring relative to the blades 24. It will be observed that a minimum weight is achieved when the ratio $R_1/R_2$ lies between 1 and 2 and an optimum range A of ratios providing minimum weights can be identified on the curve between 0.775 and 2. In other words, if the radius $R_1$ is not substantially less than 0.775 times the radius $R_2$ and is not substantially greater than twice the radius $R_2$, the pitch-change apparatus will be proportioned to provide components of minimum weight. Increasing the radius of the pitch horns 40 or decreasing the radius of the ring above the ratio of 2 increases system weight, and decreasing the radius of the pitch horns or increasing the radius of the ring below the ratio 0.775 increases the weight in a more severe fashion.

The rotary drive means for rotating the camming ring 52 about the hub axis 20 may take a number of different forms. The drive means illustrated in FIG. 2 includes an end plate 60 connected to the front end of the ring 52 and a harmonic drive, generally designated 62, which rotates the end plate 60 and the camming ring 52 relative to the blades 24.

The harmonic drive 62 includes a wave generator 64 having a plurality of lobes on its peripheral surface, ball bearings 66, a flex spline 68 and a sleeve 70 projecting forwardly from the flange 50. The flex spline 68 is fixedly connected to the one end of the sleeve 70 adjacent the bearings 54 and is engaged at two or more locations with internal splines on the end cover 60 by the lobes on the wave generator 64 and the ball bearings 66.

The end cover 60 is securely fastened to the camming ring 52 for rotation therewith but is free to rotate relative to the sleeve 70 and the central portion of the hub at the hub axis 20. In accordance with the well-known operation of harmonic drives, rotation of the wave generator 64 causes the engagements of the flex spline 68 and the end cover 60 to mutate with the rotations of the wave generator. With fewer spline teeth on the flex spline than on the end cover, each rotation of the generator causes a slight indexing of the camming ring 52 relative to the flange 50 and hub housing 30 supporting the blades. Thus, when a pitch-change is desired, the wave generator 64 must be rotated relative to the flex spline 68. At other times the camming ring 52 and flex spline 68 are locked with the wave generator so that no change in pitch occurs.

When the blades 24 are rotating with the hub housing 30 about the hub axis 20, the wave generator and associated components of the harmonic drive 62 rotate about the hub axis with the blades. A differential gear mechanism (not shown) permits pitch commands to be supplied from a non-rotating servomechanism to the rotating wave generator 64 and camming ring 52 to rotate about the ring either with the blades or relative to the blades. Harmonic drives and differential mechanisms of this type are disclosed in a thrust fan in U.S. applications Ser. Nos. 334,350 and 513,323, now U.S. Pat. Nos. 3,902,822 and 4,021,142, respectively, referenced above.

Accordingly, a pitch-change apparatus has been disclosed for collectively varying the pitch of a plurality of blades in a ducted thrust fan. The apparatus permits a large range of variations in blade pitch between forward-, feathered- and reverse pitch settings. Camming grooves provided in the ring 52 may be contoured to minimize variations in the input load curve of the apparatus for light-weight construction even though the twisting moments produced by the blades are not uniform, but vary with pitch setting. The permitted connections between the pitch-change horns 40 and the blade allow the centrifugal twisting moments to be minimized for lower load levels, and the light-weight construction of the apparatus can be optimized by selecting the radii $R_1$ and $R_2$ of the pitch-change horn and camming ring in relationship to one another.

While the present invention has been defined in a preferred embodiment, it should be understood that various modifications can be had to the apparatus without departing from the spirit of the invention. The cam follower formed by the roller 44 and the pin 42 provide a low friction cam follower for reducing loads between the camming surface of the groove 56 and the mating camming surface of the follower or roller 44. Other cam followers may be utilized, if desired. The camming ring 52 has a smaller radius at its rear side than the front side; however, this is not essential and the axial dimension may be changed to accommodate larger or smaller ranges of pitch change. The axial positioning of the ring 52 intersecting a plane defined by the blade axes 34 is not essential but is desirable since it allows the largest range of pitch-change motions with the pitchchange horn 40. Although the camming grooves 56 are shown recessed in the smooth surfaced ring 52, equivalent ribs on the ring and mating cam followers on the horns can be used. Accordingly, the present invention has been described in a preferred embodiment by way of illustration rather than limitation.

I claim:
1. A pitch-change apparatus for a ducted thrust fan having a plurality of variable pitch blades mounted on a fan hub for pivoting movement about the respective blade axes extending radially from the hub axis, comprising:
a plurality of pitch-change horns connected respectively to the plurality of variable pitch blades, each horn being connected with one blade for pivoting movement with the blade about the blade axis and projecting outwardly from the blade axis;
a camming ring mounted coaxially of the hub axis at an axially fixed station along the hub axis intercepted by the blade axes for rotation about the hub axis with the blades and relative to the blades, the ring defining on its periphery a plurality of helical camming grooves lying in a surface of revolution whose geometric center is located at the intersection of the blade axes and the hub axis;

a plurality of cam followers mounted respectively on the plurality of pitch-change horns and engaging respectively the plurality of helical camming grooves on the periphery of the camming ring; and rotary drive means connected in driving relationship with the camming ring for causing the ring to be rotated and blade pitch to be changed through the cooperative operation of the camming grooves on the ring and the cam followers on the pitch-change horns.

2. A pitch-change apparatus for a ducted thrust fan as defined in claim 1 wherein said surface of revolution is a spherical plane.

3. A pitch-change apparatus for a ducted thrust fan as defined in claim 1 wherein the opposite ends of the respective helical camming grooves on the periphery of the camming ring lie on opposite sides of a plane defined by the blade axes.

4. A pitch-change apparatus for a ducted thrust fan having a plurality of variable pitch blades mounted on a fan hub for pivoting movement about the respective blade axes extending radially from the hub axis, comprising:

a plurality of pitch-change horns connected respectively to the plurality of variable pitch blades, each horn being connected with one blade for pivoting movement with the blade about the blade axis and projecting outwardly from the blade axis;

a camming ring mounted coaxially of the hub axis at an axially fixed station along the hub axis for rotation about the hub axis with the blades and relative to the blades, the camming ring defining on its periphery a plurality of helical camming grooves lying generally in a spherical plane;

a plurality of cam followers mounted respectively on the plurality of pitch-change horns and engaging respectively the plurality of helical camming grooves on the periphery of the camming ring, the cam followers being mounted on the respective pitch-change horns at radial distances from the respective blade axes not less than 0.775 times the radius of said spherical plane; and rotary drive means connected in driving relationship with the camming ring for causing the ring to be rotated and blade pitch to be changed through the cooperative operation of the camming groove on the ring and the cam followers on the pitch-change horns.

5. A pitch-change apparatus for a ducted thrust fan as in claim 4 wherein said radial distances are not more than two times larger than the radius of said spherical plane.

6. A pitch-change apparatus for a ducted thrust fan having a plurality of variable pitch blades mounted on a fan hub for pivoting movement about the respective blade axes extending radially from the hub axis, comprising:

a plurality of pitch-change horns connected respectively to the plurality of variable pitch blades, each horn being connected with one blade for pivoting movement with the blade about the blade axis and projecting outwardly from the blade axis;

a camming ring mounted coaxially of the hub axis at an axially fixed station along the hub axis for rotation about the hub axis with the blades and relative to the blades, the ring defining on its periphery a plurality of helical camming grooves;

a plurality of cam followers mounted respectively on the plurality of pitch-change horns and engaging respectively the plurality of helical camming grooves on the periphery of the camming ring;

rotary drive means connected in driving relationship with the camming ring for causing the ring to be rotated and blade pitch to be changed through the cooperative operation of the camming grooves on the ring and the cam followers on the pitch-change horns; and the contours of the camming grooves being mated with the blade twisting moment at each pitch position for uniform loading of the rotary drive means at each pitch position.

7. A pitch-change apparatus for a ducted thrust fan as defined in claim 1 wherein the pitch-change horns are connected to the respective blades with an angular relationship about the blades axes placing the horns substantially in a plane perpendicular to the hub axis when the blades are in the feathered pitch position.

8. A pitch-change apparatus for a ducted thrust fan as defined in claim 1 wherein the pitch-change horns and the blades are interconnected respectively with an angular relationship reducing the centrifugal twisting moments of the blades.

* * * * *